July 6, 1926.
D. B. D. BLAKE
1,591,739
GLARE CURTAIN
Filed Jan. 24, 1925
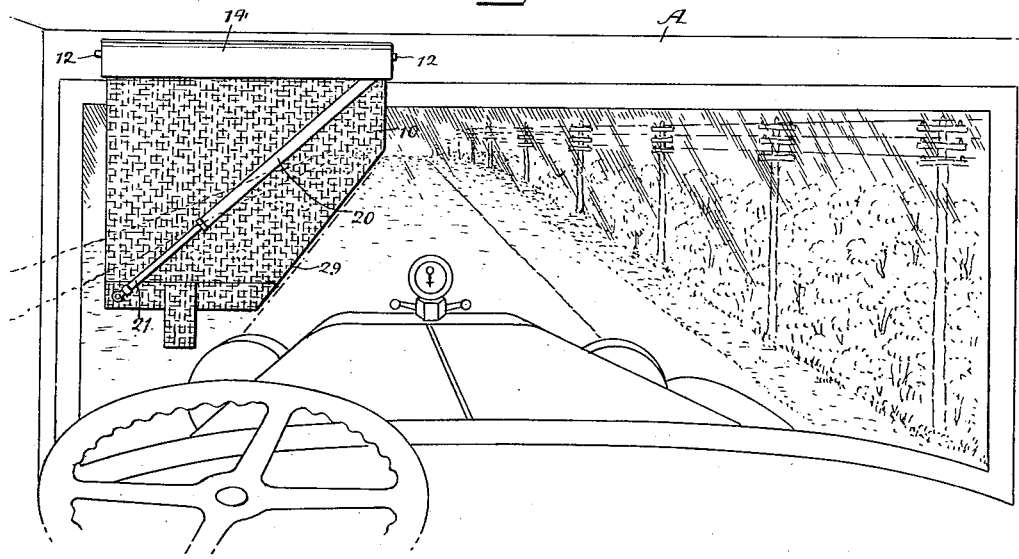
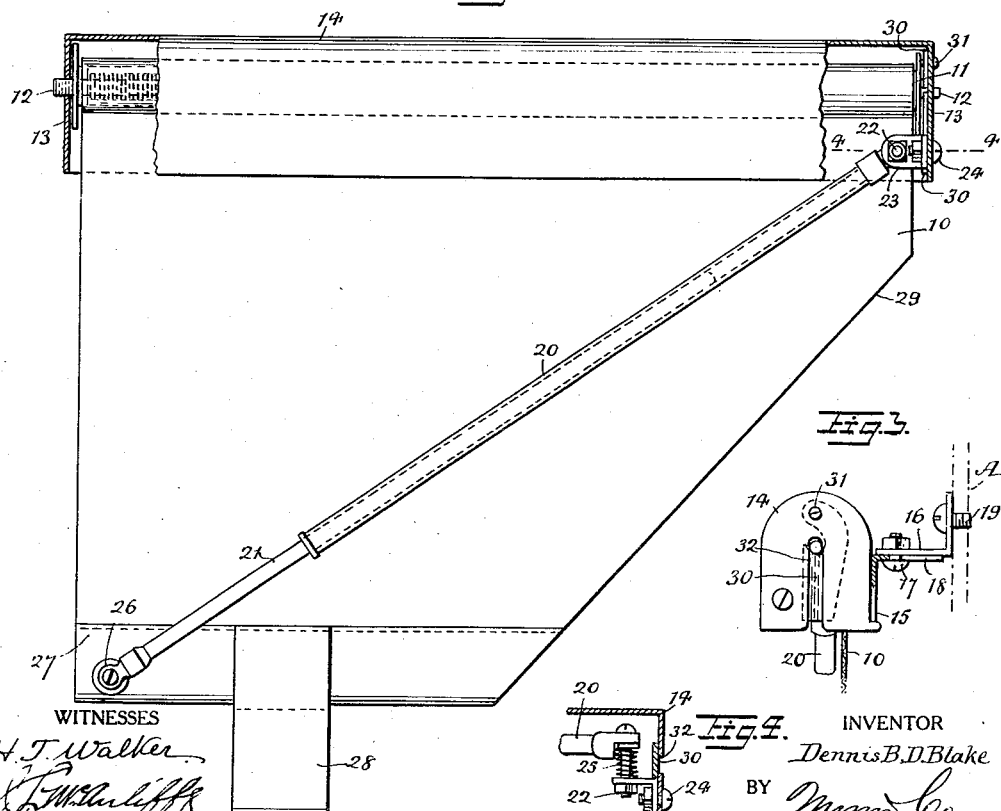
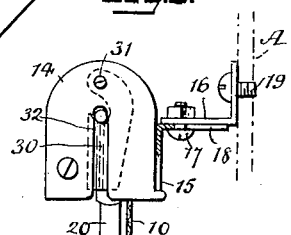
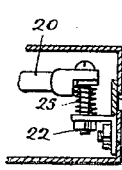
INVENTOR
Dennis B. D. Blake

Patented July 6, 1926.

1,591,739

UNITED STATES PATENT OFFICE.

DENNIS B. D. BLAKE, OF ST. LOUIS, MISSOURI.

GLARE CURTAIN.

Application filed January 24, 1925. Serial No. 4,524.

My invention relates to a curtain to be applied to the windshield of an automobile to prevent glare from automobiles approaching from the opposite directions.

The general object of my invention is to provide a glare curtain improved in various particulars affording the maximum protection against glare while minimizing the curtained area of the shield as well as provide a novel brace for the curtain arranged to automatically accommodate itself to different positions of the curtain.

The nature of my invention and its distinguishing features and advantages will clearly appear as the description proceeds.

Reference is to be had to the accompanying drawings, forming a part of this specification, it being understood that the drawings are merely illustrative of one example of the invention.

Figure 1 is an elevation of the curtain showing the same applied to the wind shield of an automobile and adjusted to prevent glare from approaching cars;

Figure 2 is an enlarged partly sectional elevation of the curtain in position for use;

Figure 3 is an end view of the curtain housing and a fragment of the curtain, the view being given to show the manner of securing the housing;

Figure 4 is a detail on the line 4—4, Figure 2.

In carrying out my invention in accordance with the illustrated example, a curtain designated generally by the numeral 10 is mounted on a roller 11, the trunnions 12 of the roller having support in the ends 13 of a housing 14. The housing 14 is formed with an angle bracket 15 to which is secured an angle bar 16 by bolts 17, each bolts 17 passing through a slot 18 in bracket 15 near the end. The angle bar 16 is secured by screws 19 to the automobile adjacent the left-hand end of the shield.

In order to brace the curtain 10 when withdrawn from the housing 14, I provide a brace designated generally by the numeral 20 comprising a tubular member and bar 21 telescoping in the tubular member. One of the brace members, as 20, is secured by a bolt 22 to a bracket 23 at an end of housing 14, said bracket being secured to the housing by a screw 24. On bolt 22 is coiled a spring 25 functioning to prevent looseness and offering a yielding frictional resistance to the swinging of the member 20 on the bolt 22. The telescoping rod 21 at its outer end is secured by a suitable fastener 26 to the curtain 10 at the edge having the stick 27.

The curtain may be unwound from the roller 11 and withdrawn from the housing 14 to the desired extent by the driver of the car taking hold of a tab 28 on the curtain. As the curtain is withdrawn from the casing, the brace composed of the elements 20, 21 will automatically accommodate itself to the changing positions of the curtain, the element 20 swinging on the bolt 22 and the element 21 pivotally turning on the fastener 26. Thus, the curtain will be held at all times against flapping. When the curtain is permitted to wind up on the roller 11, the element 21 will telescope into the element 20 so that the brace will run with the curtain into the housing 14.

It will be observed from Figures 1 and 2 that the curtain 10 at one corner is formed with an oblique edge 29 the angle of which is such that when the curtain is disposed on the windshield and withdrawn from the casing, the oblique edge 29 will correspond with the center line of the roadway so that that half of the roadway over which the automobile must travel, will be wholly visible. At the same time the curtain will effectively shield the driver of the car from the glare of lights coming in the opposite direction.

The shade roller 11 is removably supported in the housing 14 as follows: One trunnion 12 of the shade roller is received in a vertical slot 32 in the adjacent end 13 of the housing 14, said slot extending through the lower edge of said end 13. A hanger arm 30 is pivoted at its upper end as at 31 to said end 13 of the housing 14 and is so formed as to extend beneath the trunnion 13 and close the slot 32, the trunnion being thus supported on said pivoted hanger. When it is desired to remove the roller 11, the hanger 30 is swung to one side to afford clearance for the trunnion 13 to pass downwardly and out of the slot 32.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A glare curtain attachment for automobiles comprising a housing, means to secure said housing on an automobile, a roller mounted in said housing, a curtain on said roller, a diagonal brace composed of telescoping sections, means pivotally securing one of said brace sections to said housing at an end of the latter, and means pivotally securing the other brace section to the curtain near the lower corner thereof.

DENNIS B. D. BLAKE.